(12) United States Patent
Geraud (10) Patent No.: US 10,922,679 B2
(45) Date of Patent: Feb. 16, 2021

(54) METHOD FOR AUTHENTICATING PAYMENT DATA, CORRESPONDING DEVICES AND PROGRAMS

(71) Applicant: INGENICO GROUP, Paris (FR)

(72) Inventor: Remi Geraud, Valence (FR)

(73) Assignee: INGENICO GROUP, Paris (FR)

( * ) Notice: Subject to any disclaimer, the term of this patent is extended or adjusted under 35 U.S.C. 154(b) by 0 days.

(21) Appl. No.: 16/314,174

(22) PCT Filed: Jun. 30, 2017

(86) PCT No.: PCT/EP2017/066365
§ 371 (c)(1),
(2) Date: Dec. 28, 2018

(87) PCT Pub. No.: WO2018/002351
PCT Pub. Date: Jan. 4, 2018

(65) Prior Publication Data
US 2019/0228402 A1 Jul. 25, 2019

(30) Foreign Application Priority Data
Jun. 30, 2016 (FR) ...................................... 1656240

(51) Int. Cl.
*G06Q 20/32* (2012.01)
*G06Q 20/38* (2012.01)
(Continued)

(52) U.S. Cl.
CPC ....... *G06Q 20/3278* (2013.01); *G06Q 20/352* (2013.01); *G06Q 20/3823* (2013.01);
(Continued)

(58) Field of Classification Search
CPC ............... G06Q 20/327; G06Q 20/352; G06Q 20/3825; G06Q 20/3829; G06Q 20/40975
(Continued)

(56) References Cited

U.S. PATENT DOCUMENTS

2013/0013355 A1* 1/2013 Fisher .................. G06Q 20/401
705/5
2014/0032345 A1* 1/2014 Moore ............... G06Q 20/3274
705/18
(Continued)

OTHER PUBLICATIONS

International Search Report dated Sep. 21, 2017 for International Application No. PCT/EP2017/066365 filed Jun. 30, 2017.
(Continued)

*Primary Examiner* — Robert R Niquette
(74) *Attorney, Agent, or Firm* — David D. Brush; Westman, Champlin & Koehler, P.A.

(57) ABSTRACT

A method for authenticating data, implemented during a payment transaction between a merchant's communications terminal and a user device of the type including authentication by the communications terminal of at least one message generated by the user device, by using near field communications wireless data. The method includes the following acts by the user's device: obtaining an authentication code from the message, a piece of random data and a hash function; obtaining a first signature component from the message, the random piece of data, a public key of the communications terminal, a first private key of the user device and the authentication code; obtaining a second signature component from the message, the random piece of data, the public key of the communications terminal, a second private key of the user device and the authentication code; and transmitting the authentication code and of the two signature components to the communications terminal.

8 Claims, 2 Drawing Sheets

(51) Int. Cl.
| | |
|---|---|
| *G06Q 20/40* | (2012.01) |
| *H04L 9/30* | (2006.01) |
| *H04L 9/32* | (2006.01) |
| *G07F 7/08* | (2006.01) |
| *H04L 9/08* | (2006.01) |
| *G06Q 20/34* | (2012.01) |

(52) U.S. Cl.
CPC ..... *G06Q 20/3825* (2013.01); *G06Q 20/3829* (2013.01); *G06Q 20/40975* (2013.01); *G07F 7/0893* (2013.01); *H04L 9/0841* (2013.01); *H04L 9/3066* (2013.01); *H04L 9/3218* (2013.01); *H04L 9/3242* (2013.01); *H04L 9/3247* (2013.01); *H04L 2209/72* (2013.01)

(58) Field of Classification Search
USPC .......................................................... 705/44
See application file for complete search history.

(56) References Cited

U.S. PATENT DOCUMENTS

| | | | | |
|---|---|---|---|---|
| 2015/0302413 | A1* | 10/2015 | Dua ..................... | G06Q 20/327 705/44 |
| 2017/0330184 | A1* | 11/2017 | Sabt .................. | G06Q 20/3823 |

OTHER PUBLICATIONS

Written Opinion of the International Searching Authority dated Sep. 21, 2017 for International Application No. PCT/EP2017/066365 filed Jun. 30, 2017.

English Translation of Written Opinion of the International Searching Authority dated Oct. 2, 2017 for International Application No. PCT/EP2017/066365 filed Jun. 30, 2017.

International Search Report dated Sep. 21, 2017 for corresponding International Application No. PCT/EP2017/066362, filed Jun. 30, 2017.

Written Opinion of the International Searching Authority dated Sep. 21, 2017 for corresponding International Application No. PCT/EP2017/066362, filed Jun. 30, 2017.

English translation of the Written Opinion of the International Searching Authority dated Oct. 2, 2017 for corresponding International Application No. PCT/EP2017/066362, filed Jun. 30, 2017.

Van Els et al., "The Advanced Computing Systems Association Risks and Potentials of Using EMV for INternet Payments Risks and Potentials of Using EMV for Internet Payments", USENIX Workshop on Smartcard Technology Chicago, May 10, 1999 (May 10, 1999), XP055358695.

Renaud Lifchitz, "Hacking the NFC Credit Cards for Fun and DEbit", Hackito Ergo Sum 2012, Apr. 12, 2012 (Apr. 12, 2012), XP055358533.

Nyberg K. et al., "Message Recovery for Signature Schemes Based on the Discrete Logarithm Problem", Designs, Codes and Cryptography, Kluwer Academic Publishers, Boston, US, vol. 7, No. 1-02, Jan. 1, 1996 (12996-01-01), pp. 61-81, XP000905401.

Machine translation of the European Office Action dated Nov. 19, 2020 for corresponding European Application No. 17733482.8.

Machine translation of the European Office Action dated Nov. 19, 2020 for corresponding European Application No. 17733483.6.

"Next-Gen Payment Processing Architectures", Trend Micro, dated Aug. 1, 2015, XP055750190.

Libert B. et al., "Efficient Signcryption with Key Privacy from Gap Diffie-Hellman Groups", dated Feb. 26, 2004, PKC 2004, pp. 187-200, LNCS 2947, Springer, XP019002835.

* cited by examiner

METHOD FOR AUTHENTICATING PAYMENT DATA, CORRESPONDING DEVICES AND PROGRAMS

CROSS-REFERENCE TO RELATED APPLICATIONS

This Application is a Section 371 National Stage Application of International Application No. PCT/EP2017/066365, filed Jun. 30, 2017, which is incorporated by reference in its entirety and published as WO 2018/002351 A1 on Jan. 4, 2018, not in English.

1. Field of the Invention

The present technique relates to the securing of data exchanged by means of a contactless data-transmission protocol. The technique relates more particularly to an NFC-type data transmission in which a transmission is made between a first device and a second device separated by a maximum distance of about 10 cm. The technique cannot be applied and is not intended for application to WiFi, WiMax and LTE type data transmission techniques, for which the transmission technologies are different.

2. Prior Art

Many devices used in daily life are capable of communicating and exchanging data with each other. To this end, an increasing proportion of these devices use data-exchanging protocols called near-field communications protocols, or again NFC protocols. Sometimes, these data-transmission techniques are also called RFID techniques. This name is incorrect since the abbreviation NFC stands for "near field communication" while RFID relates to "radio-frequency identification" means. Both systems use radio signals for all sorts of purposes of location and tracking, and occasionally replace barcodes. Both use short-range data transmission means.

Now, the use of this type of technology causes apprehension and raises questions amongst users. Many users place little trust or no trust at all in these technologies, especially when using them to process personal and/or confidential data. This is the case for example with payment. Contactless payment devices have appeared relatively recently. These are for example contactless payment cards through which payment (the amount is generally capped) is made by placing the card on a compatible payment terminal or bringing it close to the terminal. These are also communications terminals which also integrate contactless chips: these contactless chips offer data-exchanging capacities to communications terminals, and these capacities can be used to make payments, somewhat as if the communications terminal were imitating the behavior of a contactless payment card. There are many rumors, often baseless, suggesting that contactless communications or payments are unreliable. It is also often reported that these devices are unsecured and that the data contained in these devices can be retrieved without the user's knowledge or against his wishes. Although these rumors are often baseless, there are nevertheless risks during data transmission between the devices involved and especially during the transmission of payment data. The risks however do not arise out of the technology (NFC) used per se but generally from the user himself. Thus, for example, in the case of a communications terminal using the NFC interface to make a payment, it is possible that the user will have installed an unreliable application or even a malicious application aimed at using payment data for fraudulent purposes. The situation is the same with the merchant's terminal.

For example, in the context of communications between a user device (a smartphone type communications terminal) and a payment terminal, especially using NFC protocols for payment, it is necessary for the device and the terminal to authenticate data. For this purpose, the device implements an authentication protocol with the terminal (for example a payment terminal, a merchant's terminal or any other appropriate device). The terminal checks that the authentication phase has been successful and if not, rejects the transaction and triggers an alert or implements any other behavior deemed to be appropriate in such a situation.

In typical scenarios, the terminal carrying out these checks is a secured device (such as a payment terminal). It has been designed to prevent most possible types of intrusion both hardware and software. However, if the payment terminal is a third-party device (a communications terminal of the tablet, smartphone or screen type), then the security of this (third-party) communications terminal is not guaranteed and nor is the origin of the applications installed in this terminal (by the merchant himself). If the merchant is not vigilant, it can happen that the applications installed on this terminal are fraudulent.

Here below, we present a case of possible dysfunction during a payment between a communications terminal and a user device. The designation "V" is applied to the verifier (for example the merchant's terminal or apparatus) and "P" designates the prover (the user's device: smartphone, tablet).

The payment protocols usually work as follows during the transaction: V asks P to digitally sign data. P signs the data in compliance with V's request and transmits the signed data to V. This signature is verified by V and, if it is correct, then the transaction is accepted and transferred to the rest of the payment processing sequence. Such a procedure is called a challenge-and-response procedure and is used for example in EMV applications.

The problem that the invention proposes to remedy is the following: if V works with a non-secured device (i.e. a tablet type terminal, PC or the like, to which payment functions have been attached) that is infected by a malicious software (installed by the merchant or by a ill-intentioned third party), then this software can misuse the customer's terminal P. Such misuse can for example take the form of a sequence of (invisible) transactions. This can be done for example when the merchant's terminal forces the user's device to sign arbitrary messages. The user's device, which is in "enslaved" position, is then obliged to sign this data. The malicious software installed on the merchant's terminal then uses this signed data to create fraudulent transactions.

This is the paradox of these cryptographic operations: it is certain that the processing operations carried out are right (because they implement cryptographic processing operations). However, the use that is made of the results of these cryptographic processing operations cannot be guaranteed.

3. Summary

The invention does not present these prior art problems. More particularly, the invention provides a simple solution to the problems and issues identified here above. This solution is entirely compatible with existing hardware devices.

More particularly, a method is proposed for authenticating at least one piece of data, a method implemented during a payment transaction that takes place between a merchant's terminal and a user device, a method comprising the creation of an authentication triplet, comprising an authentication code and two signature components, this triplet being built by the user device and being verifiable only by the merchant's terminal.

To this end, a method is disclosed for authentication of at least one piece of data, a method implemented during a payment transaction that takes place between a merchant's communications terminal and a user device, a method of the type comprising the authentication by the communications terminal of at least one message m generated by the user device, by means of a near field communications wireless data link, a method characterized in that it comprises, within the user's device:

- a step for obtaining an authentication code $S_1$ from the message m, a piece of random data t and a hash function H;
- a step for obtaining a first signature component $S_2$ from the message m, the random piece of data t, a public key Z of the communications terminal, a first private key x of the user device and the authentication code $S_1$;
- a step for obtaining a second signature component $S_3$ from the message m, the random piece of data t, the public key of Z of the communications terminal, a second private key y of the user device and the authentication code $S_1$;
- a step of transmission, to the communications terminal, of the authentication code $S_1$ and of the two signature components $S_2$ and $S_3$.

Such a method enables the creation of a triplet that can be transmitted to the communications terminal to enable a blind verification, by the user device, of the validity (and of the knowledge) of the message m.

According to another aspect, there is also disclosed a method of authentication that comprises, within the communications terminal:

- a step for obtaining a first reference value denoted as $U_{[r1]}$ from the first signature component $S_2$, a public key X of the user device, a private key z of the communications terminal and the authentication code $S_1$;
- a step for obtaining a second reference value denoted as $U_{[r2]}$ from the second signature component $S_3$, a public key Y of the user device, the private key z, and the authentication code $S_1$;
- a step for verifying that the first reference value $U_{[r1]}$ is equal to the second reference value $U_{[r2]}$; and, when the two values are equal:
- a step for verifying that the value $H(U_{[r2]})$ and/or $H(U_{[r1]})$ is equal to $S_1$;
- a step for issuing an assertion of authentication when the preceding verification step is positive;

Thus, without having made any reference to the message, it is possible to verify the validity of the received triplet.

According to one particular embodiment, the method comprises, for said user device, prior to said step for obtaining an authentication code, a phase for determining a set of encryption parameters comprising:

- a step for obtaining a Schnorr group (G) and a generator of this group (g);
- a step for obtaining the first private key (x), said private key being an element of the group;
- a step for obtaining the second private key (y), said private key being an element of the group G;
- a step of computation, from the first private key (x), of a public key X such that X is an exponentiation of the generator g by the private key x, $X=g^x$;
- a step of computation, from the first private key (y), of a public key Y such that Y is an exponentiation of the generator g by the private key y, $Y=g^y$.

According to one particular embodiment, the method comprises, for said merchant's communications terminal and prior to said step for obtaining a first reference value, a phase for determining a set of encryption parameters comprising:

- a step for obtaining a Schnorr group (G) and a generator of this group (g);
- a step for obtaining the private key (z), said private key being an element of the group G;
- a step of computation, from the private key (z), of a public key Z such that Z is an exponentiation of the generator g by the private key z, $Z=g^z$.

According to one particular embodiment:

- the step for obtaining the authentication code $S_1$ implements the following computation: $S_1=H(m\|t)$, where $\|$ is the concatenation operator;
- the step for obtaining the first signature component $S_2$ implements the following computation: $S_2=(m\|t)Z^{xs1}$;
- the step for obtaining the second signature component $S_3$ implements the following computation: $S_3=(m\|t)Z^{ys1}$.

According to one particular embodiment:

- the step for obtaining the first reference value $U_{[r1]}$ implements the following computation: $U_{[r1]}=s_2 X^{-zs1}$;
- the step for obtaining the second reference value $U_{[r2]}$ implements the following computation: $U_{[r2]}=s_3 Y^{-zs1}$.

According to another aspect, there is also disclosed a user device comprising a general processing unit, a memory, the device comprising a secured processing unit and a secured memory and at least one reconfigurable circuit for processing payment transactions with a communications terminal, comprising especially an authentication of a piece of data, said user device comprising:

- means for obtaining an authentication code $S_1$ from the message m, a piece of random data t and a hash function H;
- means for obtaining a first signature component $S_2$ from the message m, the random piece of data t, a public key Z of the user terminal, a first private key x of the user device and the authentication code $S_1$;
- means for obtaining a second signature component $S_3$ from the message m, the random piece of data t, the public key Z of the communications terminal, a second private key y of the user device and the authentication code $S_1$;
- means of transmission, to the communications terminal, of the authentication code $S_1$, and of the two signature components $S_2$ and $S_3$.

Such a user device generally takes the form of a smartphone type of communications terminal.

According to another aspect, the invention also discloses a merchant's terminal comprising a general processing unit, a memory, a terminal characterized in that it comprises a secured processing unit and a secured memory and at least one reconfigurable circuit for the processing of payment transactions with the user device comprising especially an authentication of a piece of data, said customer terminal comprising:

- means for obtaining first reference value denoted as $U_{[r1]}$ from the first signature component $S_2$, a public key X of the user device, a private key z of the communications terminal, and the authentication code $S_1$;

means for obtaining a second reference value denoted as $U_{[r2]}$ from the second signature component $S_3$, a public key Y of the user device, the private key z, and the authentication code $S_1$;

means of verifying that the first reference value $U_{[r1]}$ is equal to the second reference value $U_{[r2]}$; and when the values are equal:

means of verification that the value $H(U_{[r2]})$ and/or $H(U_{[r1]})$ is equal to $S_1$.

means for issuing an assertion of authentication when the previous verification step is positive.

Such a merchant terminal can take the form of a smartphone or tablet type terminal. Such a terminal can also take the form of a permanent terminal to which the methods described here above are added.

According to another aspect, the invention also relates to a communications terminal comprising a general processing unit, a memory. Such a terminal comprises a secured processing unit and a secured memory and at least one reconfigurable circuit for processing payment transactions with a user terminal, comprising especially an authentication of a piece of data, said communications terminal comprising:

means for obtaining a piece of data to be signed;
means for obtaining an identifier of said communications terminal;
means of signing, by means of a key of said communications terminal, of said piece of data to be signed and said identifier of the communications terminal, delivering a pair of pieces of signed data;
means of transmission of the pair of pieces of signed data to said user device; and
means of reception, from said user device, of a piece of encrypted data establishing the authentication of said pair of signed data.

According to another aspect, the technique also relates to a user terminal that comprises means for implementing the method as described here above.

According to a preferred implementation, the different steps of the methods according to the invention are implemented by one or more software programs or computer programs comprising software instructions that are to be executed by a data processor of a relay module according to the proposed technique, these programs being designed to control the execution of different steps of the methods.

The invention is therefore also aimed at providing a program capable of being executed by a computer or by a data processor, this program comprising instructions to command the execution of the steps of a method as mentioned here above.

This program can use any programming language whatsoever and can be in the form of source code, object code or intermediate code between source code and object code such as in a partially compiled form or in any other desirable form whatsoever.

The invention is also aimed at providing an information carrier or medium readable by a data processor, and comprising instructions of a program as mentioned here above.

The information medium can be any entity or communications terminal whatsoever capable of storing the program. For example, the medium can comprise a storage means such as a ROM, for example, a CD ROM or microelectronic circuit ROM or again a magnetic recording means, for example a floppy disk or a hard disk drive.

Furthermore, the information medium can be a transmissible medium such as an electrical or optical signal that can be conveyed via an electrical or optical cable, by radio or by other means. The program according to the proposed technique can especially be uploaded to an Internet type network.

As an alternative, the information carrier can be an integrated circuit into which the program is incorporated, the circuit being adapted to executing or to being used in the execution of the method in question.

According to one embodiment, the proposed technique is implemented by means of software and/or hardware components. In this respect, the term "module" can correspond in this document equally well to a software component as to a hardware component or to a set of hardware and software components.

A software component corresponds to one or more computer programs, one or more sub-programs of a program or more generally to any element of a program or a piece of software capable of implementing a function or a set of functions according to what is described here below for the module concerned. Such a software component is executed by a data processor of a physical entity (terminal, server, gateway, router etc) and is capable of accessing the hardware resources of this physical entity (memories, recording media, communications buses, input/output electronic boards, user interfaces etc).

In the same way, a hardware component corresponds to any element of a hardware assembly capable of implementing a function or a set of functions according to what is described here below for the component concerned. It can be a programmable hardware component or a component with an integrated processor for the execution of software, for example, an integrated circuit, a smart card, a memory card, an electronic board for the execution of firmware etc.

Each component of the system described here above can of course implement its own software components.

The different embodiments mentioned here above can be combined with one another to implement the proposed technique.

4. FIGURES

Other features and advantages of the invention shall appear more clearly from the following description of a preferred embodiment, given by way of a simple illustratory and non-exhaustive example and from the appended drawings, of which.

5. DESCRIPTION

5.1. General Principle

As explained here above, the general principle of the invention consists especially in integrating one or more additional constraints into the "challenge-response" scheme. The present invention proposes a protocol modification that makes it possible to withstand attacks by terminals comprising malicious software. Secondarily, this protocol modification also protects the terminals of the merchants themselves against unsolicited responses coming from other apparatuses (i.e. malicious apparatuses that might try to attack an authentic merchant's terminal). This protocol modification thus offers an additional layer of protection against other types of attacks (DoS or "Denial of Service", Concurrency Attacks, etc.).

Conventionally, when a payment transaction is made between a merchant's terminal and a user device, a "challenge/response" type of process is implemented so that the merchant's terminal will identify (authenticate) the user device (and vice versa) by means of the exchange of a message m. The present technique makes it possible to do without a scheme of this kind. It is thus no longer necessary to carry out a challenge-response type process. The technique implemented is therefore not a "challenge-response" type technique (which is an interactive process); nor is it a new signature (which can be publicly verified); nor is it a message authentication code (which is not possible except in the case of the sharing of a secret key).

More particularly, the approach chosen by the present technique is that of seeing to it that the user's device can prove that it has legitimately signed the message "m" (the data) to be authenticated without in any way thereby having to transmit this message (the message can for example be known on either side: by the merchant's terminal and by the user device). Thus, instead of signing the message conventionally and transmitting it (i.e. transmitting the signed message), a strategy of transmission of proof of signature of this message is adopted (this strategy can be complementary either to the transmission of this message or to the sharing of the knowledge of the message between the merchant's terminal and the user's device).

It is assumed that the merchant's terminal (it is a telephone, a tablet or a PC) is not secured as such but has securing resources. These securing resources can for example take the form of a "Secure Element—SE" or a "Trusted Execution Environment—TEE" or again another dedicated hardware or software component. It is assumed, for the explanations that follow, that the payment application of the merchant's terminal is called TPC and that it comprises a verification (identification) module called V (it is for example an SE, a TEE or more generally a secured processing unit that can even be remote, i.e. not present in the terminal). It is also assumed that there is a payment application in the user's device DU and that the user's device (DU) comprises a proof module (to confirm identity) called P (it is for example an SE, a TEE or more generally a secured processing unit). In another embodiment, the user device can be a classic payment card in which protocol and hardware modifications are made enabling the present technique to be implemented.

In general, the present technique combines the principle of Schnorr signatures and of the exchange of Diffie-Hellman keys (on the assumption of an absence of a computational solution). However, unlike in the case of Schnorr signatures (which comprise a pair of data), the technique implemented uses a signature comprising a triplet of data.

The use of such a triplet, instead of a pair (as defined in the Schnorr signature), enables the creation (in a secured manner) of an additional restriction: only one particular intended recipient can verify the signature (except in the case of Schnorr signatures which are publicly verifiable).

Besides, unlike in the conventional Schnorr method, the technique relies on the use of a pair of private keys and a pair of public keys, which are made available to the user device (and/or the proof module).

Figure 1:
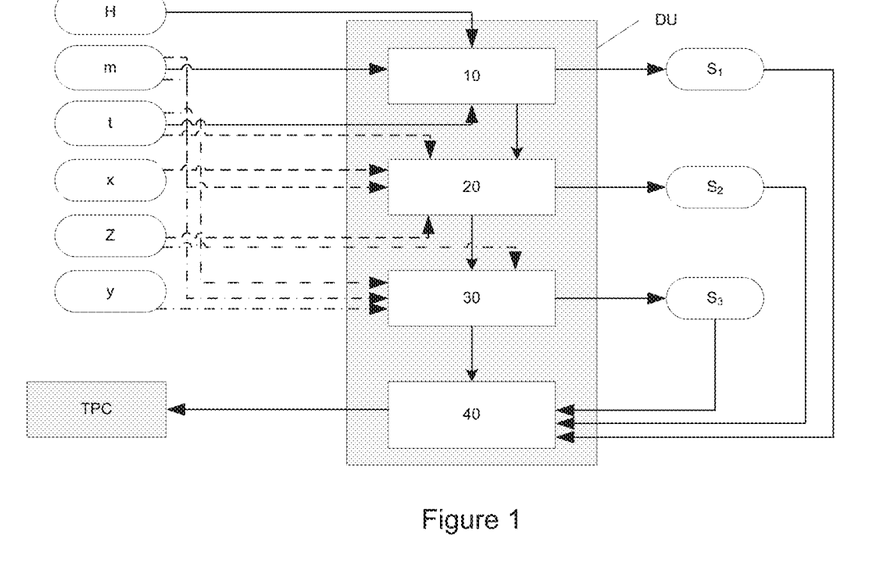
FIG. 1 is a block diagram of the proposed technique authenticating data transmitted between a merchant's communications terminal and a user device.
Figure 2:
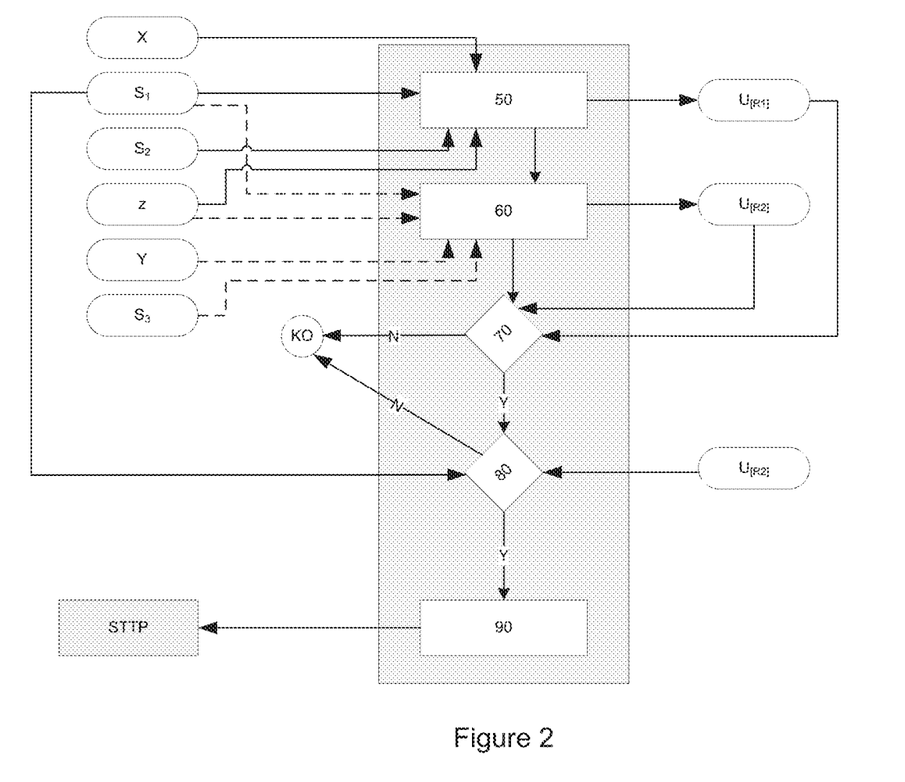
FIG. 2 is a block diagram of the proposed technique performing a signature of data within the merchant's communications terminal.

Referring to FIGS. 1 and 2, we shall now describe the proposed technique authenticating data between a merchant's communications terminal and a user device.

As explained here above, it is assumed that V and P each have, by their own means, obtained knowledge of the data to be authenticated (the message m). During the joint implementation of payment applications TPC and DU, the method implemented is on the whole the following:

the module P computes (10) an authentication code $S_1$ from the message m, a piece of random data t and a hash function H;

the module P computes (20) a first signature component $S_2$ from the message m, the piece of random data t, a public key Z of V, a first private key x of P and the authentication code $S_1$;

the module P computes (30) a second signature component $S_3$ from the message m, the piece of random data t, the public key of V, a second private key of P and the authentication code $S_1$;

the module P transmits (40) the authentication code $S_1$, and the two signature components $S_2$ and $S_3$ to the merchant's terminal (or to the module V).

These steps, performed on the user device (or the module P), are implemented on the basis firstly of private keys (two private keys) available to the user device and one public key of the merchant's terminal. In this example, it is assumed that m is known on both sides beforehand and it is only the random value t that is transmitted, with ($S_1$, $S_2$, $S_3$) that "signs" the message.

The public key of the merchant's terminal is either transmitted by the merchant's terminal at the initialization of the payment transaction or obtained for example from a database accessible from the user device. The piece of random data t is, for its part, unilaterally chosen by the user device. It goes without saying that this public key should, according to good practice, be certified by a recognized authority. However, this is not necessary for the operation of the invention and is not even useful in certain applications. The public key used for the intended recipient of the signature is not necessarily the public key of the merchant's terminal. It could for example be that of the payment processor (the module V), and then the terminal would only relay the information.

From the data received ($S_1$, $S_2$ and $S_3$), the merchant's terminal (or the module V, or a remote intended recipient), will verify (in carrying out a computation on this data) that it is truly synonymous with knowledge (by the user device or by P) of the message m.

To this end, the merchant's terminal (or the module V):

computes (50) a first reference value denoted as $U_{[r1]}$ from the first signature component $S_2$, the public key X (corresponding to the private key x), its own private key z, and the authentication code $S_1$;

computes (60) a first reference value denoted as $U_{[r1]}$ from the second signature component $S_3$, the public key Y (corresponding to the private key y), its own private key z, and the authentication code $S_1$;

verifies (70) the first reference value $U_{[r1]}$ is equal to the second reference value $U_{[r2]}$;

and, when the two values are equal:

verifies (80) that the value $H(U_{[r2]})$ is equal to $S_1$.

When the verification step (80) is positive, the method delivers an assertion of authentication. Depending on the result of this verification, the communications terminal transmits (90) a piece of transaction validation data to the payment transaction processing system (STTP).

Thus, when the two previous verifications are true, it is deduced therefrom that the user device (or the module P) knows the message m. To implement the method as described here above, in the context of a payment operator acting between the user device and the merchant's terminal, according to the present invention, only two elements need to be available (in common):

- the hash function H: this hash function is used by the module P to compute the first authentication code $S_1$ and by the module V to verify that the hashing of $U_{[r2]}$ is equal to the first authentication code $S_1$; the module V and the module P therefore share knowledge of this hash function;
- pairs of {public keys; private keys} that are used to create the signature elements;
- the message m: the message m is determined by the merchant's terminal and y the user's device.

Using the proposed technique, it is not necessary for the user device to transmit the value of this message m to the merchant's terminal: it is enough for the user device to transmit proof that it has knowledge of this message. Since the message m does not travel through the network, it cannot be intercepted and modified. It is therefore not possible to modify the components of the payment transaction.

Besides, through this technique, only the merchant's terminal (or the module V) is capable of verifying the validity of the data transmitted by the user device (or the module P). In addition, it is not even necessary for the merchant's terminal (or the module V) to have the message m available. Indeed, in the proposed technique, the message m is not used by the merchant: only the authentication code $S_1$ is used. This means that the authentication code $S_1$ can be used as proof of the validity of the payment transaction without the merchant's terminal needing to know this message. Thus, depending on the embodiment, the message authentication code $S_1$ takes the position of the authentication codes conventionally used in payment protocols and more particularly in payment protocols implemented in the context of EMV specifications. It will be understood, on reading the above, that the methods implemented both in the merchant's terminal and in the user device are independent. It will also be understood that the merchant's terminal and the user device are independent of one another. This means that it is possible to implement the methods and devices described in a system that will include a user device and a merchant's terminal carrying out a payment transaction.

5.2 Embodiment

In this purely illustrative embodiment, the proposed technique consists especially of a modification of the Schnorr signatures adapted for two users (merchant's terminal and user device). The security of the proposed technique is especially based on the Decisional Diffie-Hellman Assumption (DDH) which is an assumption on the hardness of computation based on cyclic groups.

In this embodiment, prior to the implementing of the secured exchange protocol, it is assumed that two installation phases have been carried out: one on the merchant's terminal side and one on the user's device side.

To begin with, the proposed technique is implemented on the basis of a group G suited to the problems and issues related to Schnorr signatures, with a generator g.

A Schnorr group is a sub-group of $Z_p^x$, the multiplier group of integers modulo p for a prime number p. To generate such a group, we generate p, q, and r such that p=qr+1, with p and q being prime numbers. To obtain the generator g of this group, the following method is applied:

For each integer h strictly greater than 1 and strictly smaller than p:
if $h^r \equiv 1$ (mod p) then go to the next integer;
else, the value $g=h^r$ (mod p) is a generator that is a sub-group of $Z_p^x$ of order q;

This group thus possesses a given size. The size of this group and its other parameters are typically determined beforehand. In one particular embodiment, the size of the group G is of the order of $2^{1024}$ (number 2 to the power of 1024): this means that the size of the prime number p is of the order of $2^{1024}$.

In this embodiment, the group G and the corresponding generator g has undergone a preliminary parameter-setting both in the customer's device and in the merchant's terminal. This preliminary parameter-setting can have been done for example before the installation of the payment application on the merchant's terminal side or of the payment application on the customer's device side.

In other embodiments, this parameter-setting is carried out during the payment transaction. The merchant's terminal and the user's device agree on the parameters of the group. In this case, given the fact that the group is renegotiated at each transaction, the size of this group may be reduced or limited for example by half ($2^{512}$) or more ($2^{256}$).

5.2.1 Phase of Installation on the User Device Side

The user device, which is for example a communications terminal of the smartphone or tablet type, is also equipped with an SE or a TEE (acting as a secured processing unit). It may be recalled that, in this embodiment, the customer wishes to make payment with his device. This device therefore has data needed for making a payment. It may, in one specific embodiment, be bank card data (bearer's name, PAN card number, date of validity, verification code). It may also be other data, depending on the embodiment.

In the context of the present technique, the installation phase consists of the deposition, in the SE or the TEE of the user's device (also called the module P), of the private keys x and y, used to construct the signatures elements.

This installation can typically be implemented by the installation of a payment application, as is the case with the payment application installed on the merchant's terminal.

From this group G and the selected generator g:
the user device (or the proof module P) obtains or generates a private key comprising two prime integer numbers (x,y) and, on the basis of this private key, computes a public key (X,Y), in which:
$X=g^x$;
$Y=g^y$;

Thus, in this embodiment, the two prime integer numbers (x,y) each constitute a private key of the user device while the two integer numbers X and Y each constitute the public key corresponding to these two private keys.

In this embodiment, the two pairs of private keys/public keys have undergone a preliminary parameter-setting operation in the customer's device. This preliminary parameter-setting operation can have taken place for example before the installation of the payment application on the user device side.

In other embodiments, the selection of these keys is done during the payment transaction. Before initiating the payment transaction, the user device chooses its pairs {private keys/public keys}, on the basis of the group G and the generator g. When the set of parameters is negotiated at the time of the transaction (Group G, generator g, public keys and private keys), the sizes of these parameters can advantageously be reduced because of the relative uniqueness of these parameters in themselves: indeed they are used only for a transaction, thus substantially limiting the possibilities of fraud on the part of an attacker.

One advantageous possibility is to install these keys (and group parameters) at the same time as a bank application: for example the customer's bank application. Indeed, with the development of bank applications (applications that enable the management of accounts from a smartphone or a tablet), a worthwhile solution both for the customer and for the bank can be to have a bank application that also enables the making of payments. In this case, the pieces of data needed for payment are not necessarily bank card data but can be data specifically prepared by the banking application of the bank, or even specifically prepared, at the time of payment, by the financial establishment itself (i.e. by a server to which the customer's bank application is connected).

To make a payment, in this particular case, the customer opens his bank application; selects the fact that he wishes to make a payment; enters a confidential code if any (or authenticates himself for example by biometric means) and places his device on the merchant's terminal. The bank application reacts to the requests from the merchant's terminal (as explained in the present document) and the payment is made. For the bank, as for the customer, the benefits are real both in terms of security of the transaction (made by the bank application) and in terms of fostering the loyalty of the customer (who is no longer required to make payment with a third-party application for which he does not have a guarantee, for example with regard to the security and confidentiality of the data transmitted and processed).

For implementing this technique, it is important that the merchant's terminal should have knowledge of the public keys X and Y: either the user device provides these keys during the transaction or the merchant's terminal is capable of obtaining these keys from a trusted third party. In the latter case, according to the present invention, the user's device has available an unique identifier (Uid), which is associated, for the trusted third party, with two public keys X and Y. When the merchant's terminal wishes to obtain these public keys, it sends the trusted third party a request for obtaining keys on the basis of the identifier (Uid) of the user's device. Prior to this transmission, the user device has transmitted its unique identifier to the merchant's terminal (for example during the initializing of the transaction).

5.2.2 Phase of Installation on the Merchant's Terminal Side

From this group G and the selected generator g:
the merchant's terminal (or the verification module V) obtains or generates a private key z, (random integer prime number) and on the basis of this private key, computes a public key Z, such that: $Z=g^z$;

In this embodiment, the private key/public key pair has undergone a preliminary parameter-setting operation in the merchant's terminal. This preliminary parameter-setting operation can have been carried out for example before the installation of the payment application on the merchant's terminal side.

As above, in other embodiments, the selection of these keys can be done during the payment transaction.

In the same way, as above, the user device can obtain knowledge of the public key Z of the merchant's terminal. Either the merchant's terminal transmits this key directly to the customer device or the customer device uses a unique identifier of the merchant's terminal (Cid) to obtain this public key from a trusted third party.

In one specific embodiment, the installation phase is carried out during the installation of a payment application on a communications terminal (of the smartphone, tablet or computer type) of the merchant, said communications terminal being equipped with a TEE and/or a SE (also called a module V). This embodiment has the advantage of not needing to communicate the private key z to the communications terminal as such: this piece of data is communicated only to the SE or to the TEE. Thus, it is made sure that the communications terminal (and above all the fraudulent applications, if any, of this terminal) cannot have access to this private key.

5.2.3. Running of the Authentication

In this embodiment, the authentication is implemented as follows:
the module P carries out a conversion of the message m into numerical form so that this message m corresponds to an element of the group G: to this end, the message m is converted into binary form (binary representation of the message m) and the binary form is used to obtain a digital form corresponding to an element of the group G; other methods can be envisaged depending on applications;
the module P randomly (or pseudo-randomly) selects an element t of the group G;
the module P computes an authentication code $S_1$ from the message m, the piece of random data t and the hash function H according to the following formula:

$S_1 = H(m\|t)$, where $\|$ is the concatenation operator;

the module P computes the first signature component $S_2$ from the message m, the random data t, the public key Z, the first private key x of P and the authentication code $S_1$, according to the following formula:

$S_2 = (m\|t)Z^{xs1}$ the module P computes the second signature component $S_3$ from the message m, the random data t, the public key Z, the second private key y of P and the authentication code $S_1$;

$S_3 = (m\|t)Z^{ys1}$ the module P transmits the authentication code $S_1$, and the two signature components $S_2$ and $S_3$ to the merchant's terminal (or the module V).

Thus, the user device has not transmitted the message m, or even a signed version of this message m because this message m has been concatenated with a random value (t), before being hashed to produce $S_1$. This means that a hacker who might intercept for example the authentication code $S_1$ cannot, on the basis of this code, infer the content of the message m.

The methods for computing the values $S_1$, $S_2$ and $S_3$ use x and y (which are private and therefore known to the signing party alone, i.e. the user device) and Z (which is the public key of the intended recipient, i.e. the payment terminal). Essentially, $S_2$ and $S_3$ are quantities created from these three pieces of information and the message m. The exponentiation ensures the protection of the private keys and the multiplication of the message by the exponentiated quantity protects its content.

For its part, the merchant's terminal receives the data $S_1$, $S_2$ and $S_3$. From these pieces of data, it will determine (with reasonable doubt) that they truly correspond to the results of computations made on the basis of the message m.

To this end, the merchant's terminal implements the following steps:
computing a first reference value denoted as $U_{[r1]}$ from the first signature component $S_2$, the public key X (corresponding to the private key x), its own private key Z, and the authentication code $S_1$ $$U_{[r1]} = s_2 X^{-zs1}$$

Computing a second reference value denoted as $U_{[r2]}$ from the second signature component $S_3$, the public key Y (corresponding to the private key y), its own private key Z, and the authentication code $S_{1,j}$;

$$U_{[r2]} = s_3 Y^{-zs1}$$

verifying that the first reference value $U_{[r2]}$ is equal to the second reference value $U_{[r2]}$;

and, when the two values are equal:

verifying that the value $H(U_{[r2]})$ is equal to $S_1$.

If the value of $H(U_{[r2]})$ is equal to $S_1$, then the merchant's terminal has information of sufficient certitude available to estimate that the user's device is truly in possession of the message m and that this message is authentic. This means that the merchant's terminal can terminate the transaction (for example it can transmit $S_1$ to the payment system to validate the transaction).

Explained in another way, the merchant's terminal carries out the following computations:

$$U_{[r1]} = s_2 X^{-zs1} = (m\|t)Z(x\ S1)X^{\hat{}}(-z\ S1) = (m\|t)g^{\hat{}}(z\ x\ S1)g^{\hat{}}(-z\ x\ S1) = (m\|t)$$

and $$U_{[r2]} = s_3 Y^{-zs1} = (m\|t)Z(y\ S1) = [m\|t)g^{\hat{}}(yz\ S1)g^{\hat{}}(-yz\ S1) = (m\|t)$$

Thus, the authentication of the data transmitted during a payment operation between a merchant's terminal and a user device in using near field communications (NFC) makes it possible to validate a transaction in a secured manner.

5.3. Other Characteristics and Advantages

Figure 3:
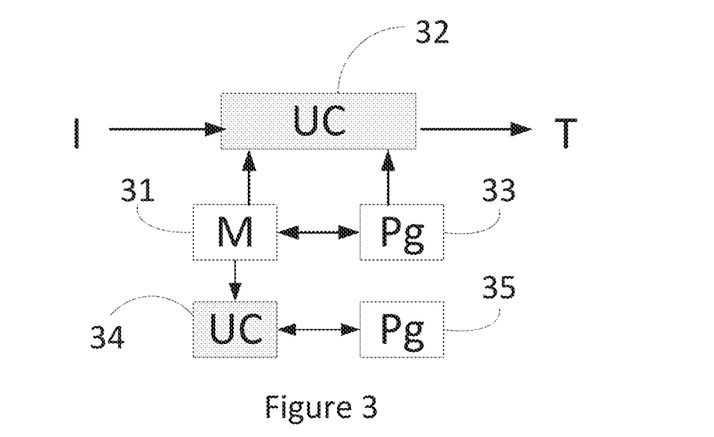
FIG. 3 is a schematic representation of the merchant's communications terminal according to the present invention.

Referring to FIG. 3, we describe a communications terminal implemented to carry out an authentication of data in the context of a payment process according to the method described here above.

For example, the communications terminal, acting as a payment terminal, comprises a memory 31 comprising especially a buffer memory, a general processing unit 32 equipped for example with a microprocessor and managed by a computer program 33, and a secured processing unit 34 (denoted as V here above), managed by a computer program 35, these processing units implementing the method of authentication as described here above to make a payment to a merchant.

At initialization, the code instructions of the computer program 35 are for example loaded into a memory and then executed by the processor of the secured processing unit 34. The secured processing unit 34 inputs at least one authentication code and two signature elements. The microprocessor of the secured processing unit 34 implements the steps of the method of authentication according to the instructions of the computer program 35 to give the general processing unit 32 a piece of data representing the validation of transaction and, as the case may be, to transmit a piece of transaction validation data to a processing system. The general processing unit 32 processes this data and transmits it to a customer's device, for example a smartphone, a tablet) in the context of a payment transaction.

To this end, the communications terminal comprises, in addition to the buffer memory 31, communications means such as network communications modules, data transmission means and data transmission circuits for transmission between the various components of the communications terminal.

These means can take the form of a particular processor implemented within the communications terminal. According to one particular embodiment, this device implements a specific application that is in charge of carrying out the transactions, this application being, for example, provided by the manufacturer of the processor in question in order to enable the use of said processor or by a provider of payment solutions for the "open" terminals. To this end, the processor comprises unique identification means. These unique identification means make it possible to ensure the authenticity of the processor.

Besides, the device furthermore comprises near field communications means, called NFC means, and means of transmission and reception of data coming from the communications network. These means also take the form of communications interfaces enabling exchanges of data on communications networks, interrogation means and means of updating databases.

Figure 4:
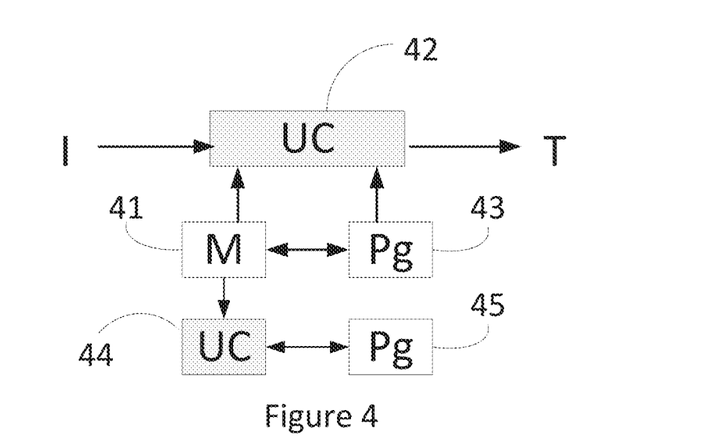
FIG. 4 schematically describes a user device according to the present invention.

Referring to FIG. 4, we describe a user device implemented to carry out an authentication of data in the context of a payment process according to the method described here above.

For example, the user device comprises a memory 41 comprising especially a buffer memory, a general processing unit 42 equipped for example with a microprocessor and managed by a computer program 43, and a secured processing unit 44 (denoted as P here above), managed by a computer program 45, these processing units implementing the method of authentication as described here above to make a payment to a merchant.

At initialization, the code instructions of the computer program 45 are for example loaded into a memory and then executed by the processor of the secured processing unit 44. The secured processing unit 44 inputs a message m of which it is necessary to prove knowledge. The microprocessor of the secured processing unit 44 implements the steps of the method of authentication according to the instructions of the computer program 45 to give the general processing unit 42, at least one authentication code and two signature elements to be transmitted to a merchant's terminal. The general processing unit 42 carries out the transmission of this data.

To this end, the user device comprises, in addition to the buffer memory 41, communications means such as network communications modules, data transmission means and data transmission circuits for transmission between the various components of the communications terminal.

These means can take the form of a particular processor implemented within the user device. According to one particular embodiment, this device implements a specific application that is in charge of carrying out the transactions, this application being, for example, provided by the manufacturer of the processor in question in order to enable the use of said processor or by a provider of payment solutions for "open" terminals. To this end, the processor comprises unique identification means. These unique identification means make it possible to ensure the authenticity of the processor.

Besides, the device furthermore comprises near field communications means, called NFC means, and means of transmission and reception of data coming from the communications network. These means also take the form of communications interfaces enabling exchanges of data on communications networks, interrogation means and means of updating databases

The invention claimed is:

1. A method of authenticating at least one piece of data, implemented during a payment transaction taking place between a communications terminal and a user device of the type comprising authentication by the communications terminal of at least one message m generated by the user device, by using a near field communications wireless data link, the method comprising the following acts performed by the user device:
   calculating an authentication code $S_1$ from the message m, a piece of random data t and a hash function H;
   calculating a first signature component $S_2$ from the message m, the random piece of data t, a public key Z of the communications terminal, a first private key x of the user device and from the authentication code $S_1$;
   calculating a second signature component $S_3$ from the message m, the random piece of data t, the public key of Z of the communications terminal, a second private key y of the user device and from the authentication code $S_1$; and
   transmitting, to the communications terminal, the authentication code $S_1$ and the two signature components $S_2$ and $S_3$.

2. The method of authentication according to claim 1, comprising the following acts performed by the communications terminal:
   obtaining a first reference value denoted as $U_{[r1]}$ from the first signature component $S_2$, a public key X of the user device, a private key z of the communications terminal and the authentication code $S_1$;
   obtaining a second reference value denoted as $U_{[r2]}$ from the second signature component $S_3$, a public key Y of the user device, the private key z, and the authentication code $S_1$; and
   verifying that the first reference value $U_{[r1]}$ is equal to the second reference value $U_{[r2]}$;
   and, when the two values are equal:
      verifying that the value $H(U_{[r2]})$ and/or $H(U_{[r1]})$ is equal to $S_1$; and
      issuing an assertion of authentication when the preceding verification step is positive.

3. The method of authentication according to claim 2, comprising, for said communications terminal and prior to the communications terminal obtaining a first reference value, a phase of determining a set of encryption parameters performed by the communication terminal comprising:
   obtaining a Schnorr group (G) and a generator of this group (g);
   obtaining the private key (z), said private key being an element of the group G;
   computing, from the private key (z), of a public key Z such that Z is an exponentiation of the generator $-g$ by the private key z, $Z=gz$.

4. The method of authentication according to claim 3, wherein:
   the act of obtaining the first reference value U[r1] implements the following computation: U[r1]=s2X−zs1;
   the act of obtaining the second reference value U[r2] implements the following computation: U[r2]=s3Y−zs1.

5. The method of authentication according to claim 1, comprising, for said user device, prior to the user device obtaining an authentication code, a phase of determining a set of encryption parameters performed by the user device comprising:
   obtaining a Schnorr group (G) and a generator of this group (g);
   obtaining the first private key (x), said private key being an element of the group G;
   obtaining the second private key (y), said private key being an element of the group G;
   computing, from the first private key (x), of a public key X such that X is an exponentiation of the generator g by the private key x, X=gx;
   computing, from the first private key (y), of a public key Y such that Y is an exponentiation of the generator g by the private key y, Y=gy.

6. The method of authentication according to claim 5, wherein:
   the act of obtaining the authentication code $S_1$ implements the following computation: $S_1$=H(m∥t), where ∥ is the concatenation operator;
   the act of obtaining the first signature component $S_2$ implements the following computation: S2=(m∥t)·Z·x·$S_1$;
   the act of obtaining the second signature component $S_3$ implements the following computation: $S_3$=(M∥t)·Z·y·$S_1$.

7. A user device comprising:
   a general processing unit;
   a memory;
   a secured processing unit;
   a secured memory; and
   at least one reconfigurable circuit formed by the general processing unit and the secured processing unit for processing payment transactions with a communications terminal, said reconfigurable circuit configuring the user device to perform acts comprising:
   calculating an authentication code $S_1$ from the message m, a piece of random data t and a hash function H;
   calculating a first signature component $S_2$ from the message m, the random piece of data t, a public key Z of the user terminal, a first private key x of the user device and the authentication code $S_1$;
   calculating a second signature component $S_3$ from the message m, the random piece of data t, the public key Z of the communications terminal, a second private key y of the user device and the authentication code $S_1$; and
   transmitting, to the communications terminal, the authentication code $S_1$, and the two signature components $S_2$ and $S_3$.

8. A non-transitory computer readable medium comprising a computer program product stored thereon which comprises program code instructions for executing a method of authenticating at least one piece of data, when the instructions are executed by a user's device during a payment transaction taking place between a communications terminal and the user device of the type comprising authentication by the communications terminal of at least one message m generated by the user device, by using a near field communications wireless data link, the method comprising the following acts performed by the user device:
   calculating an authentication code $S_1$ from the message m, a piece of random data t and a hash function H;
   calculating a first signature component $S_2$ from the message m, the random piece of data t, a public key Z of the communications terminal, a first private key x of the user device and the authentication code $S_1$;
   calculating a second signature component $S_3$ from the message m, the random piece of data t, the public key of Z of the communications terminal, a second private key y of the user device and the authentication code $S_1$; and transmitting, to the communications terminal, the authentication code $S_1$ and the two signature components $S_2$ and $S_3$.

\* \* \* \* \*